T. N. SEAY.
PLOW.
APPLICATION FILED APR. 11, 1914.
1,122,033.                                    Patented Dec. 22, 1914.
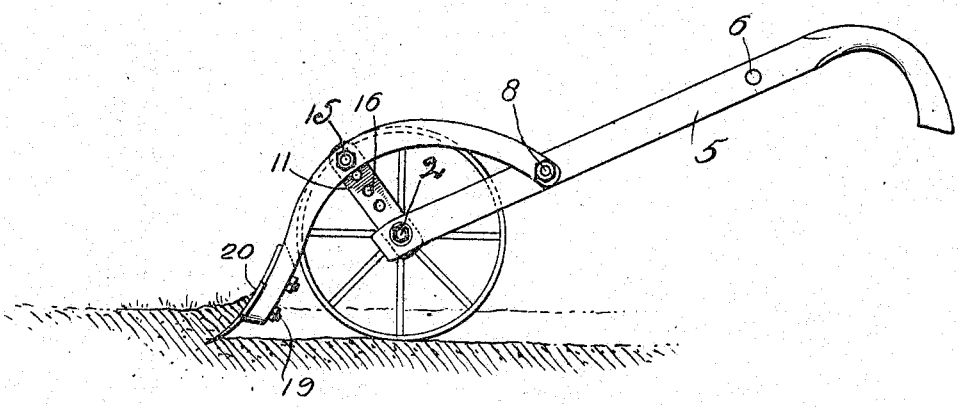
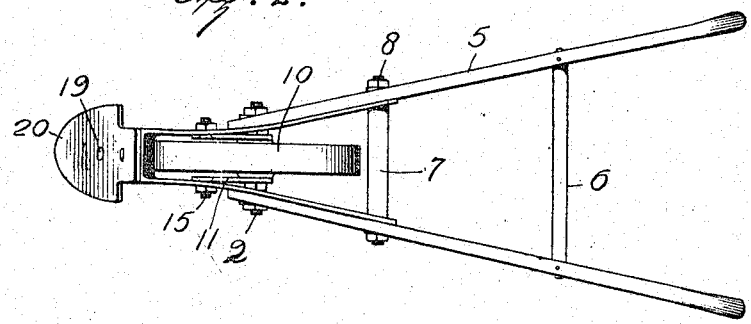
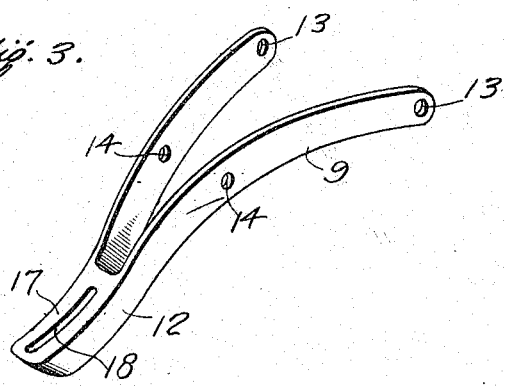
WITNESSES
INVENTOR
Thomas N. Seay,
BY
ATTORNEYS

UNITED STATES PATENT OFFICE.

THOMAS NASSERY SEAY, OF COLUMBIA, SOUTH CAROLINA.

PLOW.

1,122,033.  Specification of Letters Patent.  Patented Dec. 22, 1914.

Application filed April 11, 1914. Serial No. 831,178.

*To all whom it may concern:*

Be it known that I, THOMAS N. SEAY, a citizen of the United States, and a resident of Columbia, in the county of Richland and State of South Carolina, have invented an Improvement in Plows, of which the following is a specification.

This invention relates to plows and more particularly to an improvement in hand or garden plows.

One of the principal objects of the invention is to provide a hand plow having a plow share positioned in front of the wheel, so that the wheel travels in the furrow made by the share thus allowing an easy manipulation of the plow.

Another object of the invention is to provide a hand plow having a single wheel and a share positioned in advance of the wheel, and capable of being adjusted relatively to the wheel.

A further object of the invention is to provide an improved plow of the class described, which will be extremely simple, durable, efficient in operation and inexpensive to manufacture.

With these and other objects in view which will become apparent as the description proceeds, the invention resides in the construction, combination and arrangement of parts to be hereinafter more fully described and claimed, and illustrated in the accompanying drawing in which like characters of reference indicate like parts throughout the several figures, of which, Figure 1 represents a side elevational view of a plow constructed according to my invention and showing the same in use. Fig. 2 represents a top plan view thereof and, Fig. 3 represents a perspective view of the share support removed from the plow.

Referring more particularly to the drawing, 5 represents the handles connected near their upper ends by a cross brace 6, and near their lower end by a second cross brace comprising a sleeve 7 through which a bolt 8 extends, said bolt acting as a pivot for the upper ends of the arms 9 of the share support, said ends being pivoted on said bolt and disposed between the ends of sleeve 7, and the handles 5.

The handles converge downwardly as illustrated, and at their lower ends are connected by a bolt 2 which serves as an axle, on which the ground wheel 10 is rotatably journaled, and on which are supported the lower ends of the braces 11 which serve to hold the share support in adjusted position relative to the wheel, said braces being provided at their lower ends with openings through which the axle passes, and being disposed between the lower ends of the handles and the hub of the wheel, one on each side of the latter.

The share support is preferably cast in one piece, and comprises a body 12 from the upper end of which the arms 9 extend, and said arms diverge from the body, and are curved upwardly and rearwardly and are provided at their upper ends with openings 13 through which the bolt 8 extends, and at a point substantially midway their length with openings 14, adapted to receive short bolts 15, which extend through the braces 11 and through said arms 9, by means of which the arms may be secured in adjusted position relative to the braces and wheel, said braces provided longitudinally thereof with a series of openings 16 through any of which the bolts 15 may be passed, whereby to adjust the support, as will be readily understood. The braces 11 are pivoted on the axle 2 so that any of the openings in the braces may be brought into the arc described by the points on arms 9 in which the openings 14 occur, as the arms are swung upwardly or downwardly on their pivot 8.

The body 12 of the support is slightly concaved on its upper surface 17, and is provided with a longitudinal slot 18 through which the bolts 19 extend, whereby the share 20 may be secured upon its support.

By the construction described, it is apparent that the plow share or point 20 which although is shown as being shovel-shaped may be of any suitable form, is securely braced relative to lateral movement by means of its support, and that it is readily capable of adjustment vertically, so that different requirements relative to the nature of the plowing to be done and the condition of the soil, may be complied with.

A plow such as described may be used to advantage in plowing around vegetables, since the plow blade or share going in front, lifts up the leaves and passes by without bruising or mashing them. It is apparent that the plow blade may run out clear to the end of the row and thereby be used to cultivate the ground which ordinarily is left at the ends of the rows, when ordinary plows are used. Another advantage accruing to my plow, is that when plants are put in checks and have been plowed one way, it will be found very easy to plow across, as the wheel travels in the furrow made by the plow blade, and will not have to pass over the beds, but will have a smooth level movement.

Although I have described the preferred embodiment of my invention, I may desire to make such changes in the construction, combination and arrangement of parts thereof as do not depart from the spirit of the invention and the scope of the appended claims.

I claim:

1. A plow comprising a pair of handles converging toward their lower ends, an axle connecting the lower ends of the handles, a ground wheel journaled on said axle between said handles, braces comprising flat plates pivoted on said axle between said wheel and handles, a share support, said support comprising a body having a pair of arms diverging upwardly and rearwardly therefrom, said arms at their rear ends provided with openings, a bolt extending through said handles and through the openings in the rear ends of the arms, a sleeve disposed on said bolt between said arms, said arms being positioned between said sleeve and the handles, a plow share carried by said support, and bolts extending through said braces and through openings intermediate the ends of said arms for securing said arms in adjusted position relative to said braces, the latter provided with a series of openings adapted to receive last said bolts, whereby said support may be adjusted.

2. A plow comprising a pair of handles, an axle connecting said handles at their lower ends, a wheel journaled on the said axle between said handles, a share support comprising a body having a pair of arms extending therefrom, said arms being pivoted at their rear ends to said handles, means whereby a plow share may be secured to the support, and means supported by said axle whereby said support may be adjusted relatively to the wheel.

3. A plow comprising a pair of handles, a wheel journaled between them, and a share support connected to said handles, said support comprising a body having a pair of integral arms extending upwardly and rearwardly therefrom, said arms diverging from said body, said body provided with a concaved face and with an elongated slot extending longitudinally through the body.

4. A plow comprising a pair of handles, a ground wheel journaled between them, a share support, said support comprising a body portion disposed adjacent said wheel and forwardly thereof, means for pivoting said support to said handles, and means whereby said support may be adjusted relatively to said wheel.

THOMAS NASSERY SEAY.

Witnesses:
J. D. MILHOUS,
W. W. CLARK.

Copies of this patent may be obtained for five cents each, by addressing the "Commissioner of Patents, Washington, D. C."